United States Patent
Yi et al.

(10) Patent No.: US 10,134,493 B2
(45) Date of Patent: Nov. 20, 2018

(54) REACTOR AND OPERATING METHOD FOR THE REACTOR

(71) Applicant: KOREA ATOMIC ENERGY RESEARCH INSTITUTE, Daejeon (KR)

(72) Inventors: Sung-Jae Yi, Daejeon (KR); Chul-Hwa Song, Daejeon (KR); Hyun Sik Park, Daejeon (KR); Sung Won Bae, Daejeon (KR); Rae-Joon Park, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 607 days.

(21) Appl. No.: 14/822,367

(22) Filed: Aug. 10, 2015

(65) Prior Publication Data
US 2016/0042816 A1    Feb. 11, 2016

(30) Foreign Application Priority Data

Aug. 11, 2014  (KR) ........................ 10-2014-0103110

(51) Int. Cl.
*G21C 15/18*  (2006.01)
*G21C 9/004*  (2006.01)
*G21C 1/32*  (2006.01)

(52) U.S. Cl.
CPC ............. *G21C 9/004* (2013.01); *G21C 15/18* (2013.01); *G21C 1/32* (2013.01); *Y02E 30/40* (2013.01)

(58) Field of Classification Search
CPC .......... G21C 9/004; G21C 15/18; G21C 1/32
USPC ................................................ 376/282, 283
See application file for complete search history.

(56) References Cited

U.S. PATENT DOCUMENTS

2013/0202075 A1\*  8/2013  Kwon ................... G21C 15/18
376/298

FOREIGN PATENT DOCUMENTS

| JP | 2010217091 A | 9/2010 |
|---|---|---|
| KR | 1020010076565 A | 8/2001 |
| KR | 1020090021722 A | 3/2009 |
| KR | 1020130129606 A | 11/2013 |
| KR | 101416912 B | 7/2014 |

\* cited by examiner

*Primary Examiner* — Jack W Keith
*Assistant Examiner* — Daniel Wasil
(74) *Attorney, Agent, or Firm* — McCoy Russell LLP

(57) ABSTRACT

Provided are a nuclear reactor and an operating method for the reactor. The reactor includes a driving system and a safety system. The safety system includes isolation vessels, heat exchangers, a coolant pipe, and a communication pipe. Fluid is distributed in the safety system according to thermal, pressure, and leak conditions.

9 Claims, 7 Drawing Sheets

REACTOR AND OPERATING METHOD FOR THE REACTOR

CROSS-REFERENCE TO RELATED APPLICATIONS

This application claims priority under 35 U.S.C. § 119 to Korean Patent Application No. 10-2014-0103110, filed on Aug. 11, 2014, in the Korean Intellectual Property Office, the disclosure of which is incorporated herein by reference in its entirety.

TECHNICAL FIELD

The following disclosure relates to a reactor and an operating method for the reactor, and more particularly, to a reactor which may passively cool excessively generated heat without an operation of an operator at the time of abnormality of the reactor, completely passively perform the cooling operation for safety procedures by a structure of the reactor and a change in environmental conditions such as a pressure, etc., without a separate control command, and have a simpler structure than the existing reactor safety system, and an operating method for the reactor.

BACKGROUND

Nuclear power generation is made by a method for turning a turbine using energy generated at the time of nuclear fission to generate electric energy. FIG. 1 schematically illustrates a principle of typical nuclear power generation. An enormous amount of heat energy is generated by the nuclear fission of nuclear fuel within a pressure vessel (or referred to as a reactor vessel). The heat energy is transferred to a coolant within the pressure vessel and the coolant is circulated to be released from the pressure vessel and to be reintroduced into the pressure vessel via a heat exchanger, as illustrated by a thick arrow in FIG. 1. The heat energy of the coolant is transferred to a steam generator while passing through the heat exchanger and water within the steam generator is converted into high-temperature and high-pressure steam due to the heat energy. The so generated high-temperature and high-pressure steam is supplied to the turbine as illustrated by a thin arrow in FIG. 1, the turbine rotates by power of steam, a generator connected to the turbine rotates together, thereby generating power. The steam from which the energy is lost by the rotation of the turbine again goes through the phase change to be converted into water. As illustrated by the thin arrow in FIG. 1, the water is reintroduced into the steam generator and is thus circulated.

FIG. 1 illustrates only systems which are a subject of the nuclear power generator. Actually, the reactor is essentially provided with the safety system. As described above, very high heat is generated when the reactor is operated. The high-heat environment includes a very high risk to cause disaster when the reactor is damaged. Therefore, when the reactor is damaged, the safety system should be essentially provided to quickly cool the reactor.

Therefore, the related art includes various types of safety systems which may safely cool the reactor at the time of the accident of the reactor. Describing in more detail, the safety system which is applied to the existing reactor may include components (ex. passive residual heat removal (PRHR) system, etc.) which circulate the coolant accommodated in the reactor vessel to the outside, components (ex. core make-up tank (CMT), safety injection pump (SI pump), etc.) which supply the coolant separately accommodated in the outside to the vessel), etc. The example is illustrated in FIG. 2. Further, all of the safety systems of the foregoing example use the coolant (water) to perform the cooling. To more increase cooling efficiency, the configuration of the safety systems which simultaneously use air and water is also disclosed. As an example of the safety system technology of diversifying a heat sink using air and water, there are Japanese Patent Laid-Open Publication No. 2010-217091 ("Containment Vessel Passive Cooling System And Liquid-Metal-Cooled-Reactor"), Korean Patent Laid-Open Publication No. 2009-0021722 ("Air/Water Hybrid Passive Reactor Cavity Cooling Apparatus And Method For Core Decay Heat Removal Of High Temperature Gas-Cooled Reactor"), etc.

However, research and development for more improving efficiency of a reactor driving system have been continuously conducted and therefore only the typical safety system may not obtain the sufficient cooling efficiency. Further, if the safety system is configured to be operated by receiving a separate control command even at the moment of urgent accident like the damage of the reactor, there are many risks that the safety system malfunctions due to the damage of the control system and thus the safety system is not properly operated, an operator of the reactor does not issue the control command in time, etc. In addition, as described in the foregoing related arts, since the structure of the reactor safety system is very complicated and multiplexed, design factors to be considered to construct facilities are too many and thus it is very difficult to design and actually construct the safety system and even after the facility construction is completed, ones to be tested or monitored are too many for safe operation and thus it is difficult to operate and control the safety system.

Therefore, a need exists for the reactor safety system which may more improve the cooling efficiency than that of the existing safety system, may be completely passively operated without performing the separate control operation of the operator, and may have a simpler structure than the existing reactor safety system.

RELATED ART DOCUMENT

Patent Document

1. Japanese Patent Laid-Open Publication No. 2010-217091 ("Containment Vessel Passive Cooling System And Liquid-Metal-Cooled-Reactor")
2. Korean Patent Laid-Open Publication No. 2009-0021722 ("Air/Water Hybrid Passive Reactor Cavity Cooling Apparatus And Method For Core Decay Heat Removal Of High Temperature Gas-Cooled Reactor")

SUMMARY

An embodiment of the present invention is directed to providing a reactor which may passively cool excessively generated heat without an operation of an operator at the time of abnormality of the reactor, completely passively perform the cooling operation for safety procedures by a structure of the reactor and a change in environmental conditions such as a pressure, etc., without a separate control command, and have a simpler structure than the existing reactor safety system, and an operating method for the reactor.

In one general aspect, a reactor includes: a reactor driving system configured to include a reactor vessel accommodating a reactor core and a steam generator to which a steam pipe and a water supply pipe are connected; and a reactor safety system configured by being divided into an energy release space (ESR) accommodating the reactor driving system, an energy absorbing space (EAS) communicating with the energy release space through a passage formed thereover and accommodating a coolant, and an energy transfer space (ETS) formed to be isolated from the energy release space and the energy absorbing space and having a heat exchange device provided therein to transfer heat released from the reactor driving system to the coolant, the heat exchange device being connected to the energy release space and the energy absorbing space, respectively, wherein the coolant within the reactor safety system is selectively distributed in response to thermal-hydraulic conditions changed depending on a change in pressure within the reactor driving system and whether the coolant is leaked to cool the reactor driving system.

In another general aspect, a reactor includes: a reactor driving system configured to include a reactor vessel 112 accommodating a reactor core 111 and a steam generator 113 to which a steam pipe 114 and a water supply pipe 115 are connected; and a reactor safety system configured to include a releasing isolation vessel 120 accommodating gas and the reactor driving system, an absorbing isolation vessel 130 communicating with the releasing isolation vessel 120 through a passage 123 formed over the releasing isolation vessel 120 and accommodating a coolant, a transferring isolation vessel 140 provided over the absorbing isolation vessel 130 to accommodate the gas and the coolant, a releasing heat exchanger 121 and an absorbing heat exchanger 131 adjacently disposed to each other within the transferring isolation vessel 140 to exchange heat with each other, a coolant spray pipe 134 spraying the coolant to the releasing heat exchanger 121 and the absorbing heat exchanger 131 adjacently disposed to each other, a condensing heat exchanger 133 disposed outside the isolation vessels, a releasing heat exchange channel 122 connected to the reactor vessel 112 and the releasing heat exchanger 121 to circularly distribute the coolant, and an absorbing heat exchange channel 132 connected to the absorbing heat exchanger 131 and the condensing heat exchanger 133 to circularly distribute the coolant, wherein the coolant within the reactor safety system is selectively distributed in response to thermal-hydraulic conditions changed depending on a change in pressure within the reactor driving system and whether the coolant is leaked to cool the reactor driving system.

In the reactor safety system, the coolant sprayed from the coolant spray pipe 134 may absorb heat from the coolant distributed within the releasing heat exchanger 121 to be evaporated, the coolant distributed within the absorbing heat exchanger 131 may absorb the heat of the steam generated by the evaporation to be condensed and may be formed to be accommodated into the transferring isolation vessel 140, and the heat transfer may be made by the two-phase heat transfer mechanism for transferring heat from the coolant within the releasing heat exchanger 121 to the coolant within the absorbing heat exchanger 131 by evaporating and the condensing the steam sprayed by the coolant spray pipe 134.

The coolant spray pipe 134 may have one end communicating with the absorbing isolation vessel 130 to be supplied with the coolant and the other end provided with the nozzle to spray the supplied coolant to the releasing heat exchanger 121 and the absorbing heat exchanger 131 and is provided with a coolant spray valve 134a. The reactor safety system may further include: a coolant injection pipe 135 having one end communicating with the transferring isolation vessel 140 and the other end communicating with the releasing isolation vessel 120 to inject the coolant accommodated in the transferring isolation vessel 140 into the releasing isolation vessel 120; and a coolant injection valve 135a provided on the coolant injection pipe 135.

The transferring isolation vessel 140 may have an accommodating barrier 141 enclosing an area in which the releasing heat exchanger 121 and the absorbing heat exchanger 131 are disposed to accommodate the cold water within the transferring isolation vessel 140.

The passage 123 may be formed in a double barrier form in which a releasing isolation vessel barrier 123a is formed at the releasing isolation vessel 120 and has an upper portion opened and an absorbing isolation vessel barrier 123b is formed at the absorbing isolation vessel 130 and has a lower portion opened.

The reactor safety system may further include: a releasing isolation vessel communicating pipe 124 formed to communicate between the upper portion of the releasing isolation vessel 120 and the upper portion of the transferring isolation vessel 140; and a releasing isolation vessel communicating valve 124a provided on the releasing isolation vessel communicating pipe 124.

The reactor safety system may further include: a releasing isolation vessel pressure reducing pipe 125 formed to communicate between a lower portion of the releasing isolation vessel 120 and a lower portion of the absorbing isolation vessel 130; and a releasing isolation vessel pressure reducing valve 125a provided on the releasing isolation vessel pressure reducing pipe 125.

The reactor safety system may further include: a steam bypass pipe 126 having one end communicating with the steam pipe 114 and the other end communicating with the releasing heat exchange channel 122 to distribute the steam generated by the evaporation of the coolant within the steam generator 113 to the releasing heat exchange channel 122; and a steam bypass valve 126a provided on the steam bypass pipe 126.

The reactor safety system may further include: a steam release pipe having one end communicating with the steam pipe 114 and the other end communicating with the space within the releasing isolation vessel 120 to release the steam generated by the evaporation of the coolant within the reactor vessel 112 to the space within the releasing isolation vessel 120; and a steam release valve 127a provided on the steam release pipe.

The reactor safety system may further include: a coolant supplement pipe 136 having one end communicating with the releasing heat exchange channel 122 and the other end communicating with a space under the surface of the coolant within the absorbing isolation vessel 130 or the transferring isolation vessel 140 to supplement the coolant to the releasing heat exchange channel 122 and a coolant supplement valve 136a provided on the coolant supplement pipe 136.

The reactor safety system may further include: an auxiliary waste heat removing part 150 including an auxiliary absorbing heat exchanger 151 disposed within the absorbing isolation vessel 130, an auxiliary condensing heat exchanger 153 disposed outside the isolation vessels, and an auxiliary absorbing heat exchange channel 152 connected to the auxiliary absorbing heat exchanger 151 and the auxiliary condensing heat exchanger 153 to circularly distribute the coolant.

In another general aspect, an operating method for a reactor operates the reactor configured as described above and the operating method includes: isolating which includes stopping a reactor driving system and closing a steam pipe isolation valve 114a included in a steam pipe 114 and a water supply pipe isolation valve 115a included in a water supply pipe 115; circulating the coolant into a releasing heat exchanger which includes introducing steam generated by evaporation of a coolant within a reactor vessel 112 into the releasing heat exchanger 121 through a releasing heat exchange channel 122; and generating the cooler by condensing steam introduced into the releasing heat exchanger 121 by passing the stream through the releasing heat exchanger 121 and circulating the generated coolant by reintroducing the generated coolant into the reactor vessel 112 through the releasing heat exchange channel 122; transferring a two-phase heat which includes spraying the coolant supplied by a coolant spray pipe 134 to an outer surface of the releasing heat exchanger 121 to contact the outer surface of the releasing heat exchanger 121; evaporating the coolant contacting the outer surface of the releasing heat exchanger 121 by allowing the coolant to absorb heat from the steam within the releasing heat exchanger 121 and condensing the steam within the releasing heat exchanger 121 to generate the coolant; allowing the steam generated by the evaporation at the outer surface of the releasing heat exchanger 121 to contact the outer surface of the absorbing heat exchanger 131; allowing the steam contacting the outer surface of the absorbing heat exchanger 131 to release heat to the coolant within the absorbing heat exchanger 131 to be condensed by the coolant and evaporating the coolant within the absorbing heat exchanger 131 to generate the steam; and circulating the absorbing heat exchanger which includes introducing the steam within the absorbing heat exchanger 11 into the condensing heat exchanger 133 through the absorbing heat exchange channel 131, condensing the steam introduced into the condensing heat exchanger 133 by passing the steam through the condensing heat exchanger 133 to generate the coolant, and circulating the generated coolant by reintroducing the generated coolant into the absorbing heat exchanger 131 through the absorbing heat exchange channel 132.

The coolant spray pipe 134 may have one end communicating with the absorbing isolation vessel 130 to be supplied with the coolant and the other end provided with the nozzle to spray the supplied coolant to the releasing heat exchanger 121 and the absorbing heat exchanger 131 and is provided with a coolant spray valve 134a, and the reactor safety system may further include: a coolant injection pipe 135 having one end communicating with the transferring isolation vessel 140 and the other end communicating with the releasing isolation vessel 120 to inject the coolant accommodated in the transferring isolation vessel 140 into the releasing isolation vessel 120; and a coolant injection valve 135a provided on the coolant injection pipe 135, and the operating method for a reactor further include: pressurizing the releasing isolation vessel 120 and spraying the coolant which includes leaking the steam generated by the evaporation of the coolant within the reactor vessel 112 to fill the space within the releasing isolation vessel 120 so as to pressurize the releasing isolation vessel 120; transferring the pressure to the coolant within the absorbing isolation vessel 130 through the passage 1230 to introduce the coolant into the coolant spray pipe 134; and opening the coolant spray valve 134a by the pressure to spray the coolant to the releasing heat exchanger 121 and the absorbing heat exchanger 131 through the coolant spray pipe 134; and directly cooling the coolant which includes accommodating the coolant generated by condensing steam by performing the two-phase heat transfer into the transferring isolation vessel 140; introducing the coolant accommodated in the transferring isolation vessel 140 into the coolant injection pipe 135; and opening the coolant injection valve 135a by the pressure to inject the coolant into the releasing isolation vessel 120 through the coolant injection pipe 135 so that the coolant directly contacts the reactor vessel 112 to perform cooling.

The reactor safety system may further include: a releasing isolation vessel communicating pipe 124 formed to communicate between the upper portion of the releasing isolation vessel 120 and the upper portion of the transferring isolation vessel 140; and a releasing isolation vessel communicating valve 124a provided on the releasing isolation vessel communicating pipe 124, and the operating method for a reactor may further include: leaking the steam generated by the evaporation of the coolant within the reactor vessel 112 to fill the space within the releasing isolation vessel 120 so as to pressurize the releasing isolation vessel 120; and opening the releasing isolation vessel communicating valve 124a by the pressure to releasing the steam within the releasing isolation vessel 120 to the transferring isolation vessel 140 through the releasing isolation vessel communicating pipe 124 so as to fill and pressurize the space within the transferring isolation vessel 140, such that auxiliary pressurization for opening the coolant injection valve 135a in the direct cooling of the coolant is additionally performed.

The reactor safety system may further include: a releasing isolation vessel pressure reducing pipe 125 formed to communicate between a lower portion of the releasing isolation vessel 120 and a lower portion of the absorbing isolation vessel 130; and a releasing isolation vessel pressure reducing valve 125a provided on the releasing isolation vessel pressure reducing pipe 125, and the operating method for a reactor may further include leaking the steam generated by the evaporation of the coolant within the reactor vessel 112 to fill the space within the releasing isolation vessel 120 so as to pressurize the releasing isolation vessel 120; filling the releasing isolation vessel 120 with the coolant by the direct cooling of the coolant; and opening the releasing isolation vessel pressure reducing valve 125a by the pressure to release the coolant within the releasing isolation vessel 120 to the absorbing isolation vessel 130 through the releasing isolation vessel pressure reducing pipe 125, such that the pressure reduction of the overpressure formed within the releasing isolation vessel 120 is additionally performed.

The reactor safety system may further include a steam bypass pipe 126 having one end communicating with the steam pipe 114 and the other end communicating with the releasing heat exchange channel 122 to distribute the steam generated by the evaporation of the coolant within the steam generator 113 to the releasing heat exchange channel 122; and a steam bypass valve 126a provided on the steam bypass pipe 126, and the operating method for a reactor may further include pressurizing the space within the steam generator 113 by the steam generated by the evaporation of the coolant within the steam generator 113; and opening the steam bypass valve 126a by the pressure to introduce the steam within the steam generator 113 into the releasing heat exchange channel 122 through the steam bypass pipe 126, such that the steam auxiliary introduction into the releasing heat exchange channel 122 is additionally performed.

The reactor safety system may further include a steam release pipe having one end communicating with the steam pipe 114 and the other end communicating with the space within the releasing isolation vessel 120 to release the steam generated by the evaporation of the coolant within the reactor vessel 112 to the space within the releasing isolation vessel 120 and a steam release valve 127a provided on the steam release pipe, and the operating method for a reactor may further include pressurizing the space within the steam generator 113 by the steam generated by the evaporation of the coolant within the steam generator 113; and opening the steam release valve 127a by the pressure to release the steam within the steam generator 113 to the releasing isolation vessel 120 through the steam release pipe, such that the auxiliary pressurization within the releasing isolation vessel 120 is be additionally performed.

The reactor safety system may further include a coolant supplement pipe 136 having one end communicating with the releasing heat exchange channel 122 and the other end communicating with a space under the surface of the coolant within the absorbing isolation vessel 130 or the transferring isolation vessel 140 to supplement the coolant to the releasing heat exchange channel 122 and a coolant supplement valve 136a provided on the coolant supplement pipe 136, and the operating method for a reactor may further include opening the coolant supplement valve 136a by the pressure to introduce the coolant into the releasing heat exchange channel 122 through the coolant supplement pipe 136, such that the auxiliary introduction of the coolant into the releasing heat exchange channel 122 may be additionally performed.

The reactor safety system may further include an auxiliary waste heat removing part 150 which includes an auxiliary absorbing heat exchanger 151 disposed within the absorbing isolation vessel 130, an auxiliary condensing heat exchanger 153 disposed outside the isolation vessels, and an auxiliary absorbing heat exchange channel 152 connected to the auxiliary absorbing heat exchanger 151 and the auxiliary condensing heat exchanger 153 to circularly distribute the coolant, and the operating method for a reactor may further include removing auxiliary waste heat which includes absorbing, by a coolant within the auxiliary absorbing heat exchanger 151, heat from the coolant within the absorbing isolation vessel 130, introducing the coolant within the auxiliary absorbing heat exchanger 151 into the auxiliary condensing heat exchanger 153 through the auxiliary absorbing heat exchange channel 152, releasing the coolant within the auxiliary condensing heat exchanger 153 to external environment, and reintroducing the coolant within the auxiliary condensing heat exchanger 153 into the auxiliary absorbing heat exchanger 151 through the auxiliary absorbing heat exchange channel 152 to be circulated.

In another general aspect, an operating method for a reactor operates the reactor configured as described above and the operating method includes: isolating which includes stopping a reactor driving system and closing a steam pipe isolation valve 114a included in a steam pipe 114 and a water supply pipe isolation valve 115a included in a water supply pipe 115; circulating the coolant into a releasing heat exchanger which includes introducing steam generated by evaporation of a coolant within a reactor vessel 112 into the releasing heat exchanger 121 through a releasing heat exchange channel 122; and generating the coolant by condensing steam introduced into the releasing heat exchanger 121 by passing the steam through the releasing heat exchanger 121 and circulating the generated coolant by reintroducing the generated coolant into the reactor vessel 112 through the releasing heat exchange channel 122; performing a two-phase heat transfer which includes spraying the coolant supplied by a coolant spray pipe 134 to an outer surface of the releasing heat exchanger 121 to contact the outer surface of the releasing heat exchanger 121; evaporating the coolant contacting the outer surface of the releasing heat exchanger 121 by allowing the coolant to absorb heat from the steam within the releasing heat exchanger 121 and condensing the steam within the releasing heat exchanger 121 to generate the coolant; allowing the steam generated by the evaporation at the outer surface of the releasing heat exchanger 121 to contact the outer surface of the absorbing heat exchanger 131; allowing the steam contacting the outer surface of the absorbing heat exchanger 131 to release heat to the coolant within the absorbing heat exchanger 131 to be condensed to the coolant and evaporating the coolant within the absorbing heat exchanger 131 to generate the steam; and circulating the absorbing heat exchanger which includes introducing the steam within the absorbing heat exchanger 131 into the condensing heat exchanger 133 through the absorbing heat exchange channel 132, condensing the steam introduced into the condensing heat exchanger 133 by passing the steam through the condensing heat exchanger 133 to generate the coolant, and circulating the generated coolant by reintroducing the generated coolant into the absorbing heat exchanger 131 through the absorbing heat exchange channel 132.

The coolant spray pipe 134 may have one end communicating with the absorbing isolation vessel 130 to be supplied with the coolant and the other end provided with the nozzle to spray the supplied coolant to the releasing heat exchanger 121 and the absorbing heat exchanger 131 and is provided with a coolant spray valve 134a, and the reactor safety system may further include: a coolant injection pipe 135 having one end communicating with the transferring isolation vessel 140 and the other end communicating with the releasing isolation vessel 120 to inject the coolant accommodated in the transferring isolation vessel 140 into the releasing isolation vessel 120; and a coolant injection valve 135a provided on the coolant injection pipe 135, and the operating method for a reactor further include: pressurizing the releasing isolation vessel 120 and spraying the coolant which includes leaking the steam generated by the evaporation of the coolant within the reactor vessel 112 to fill the space within the releasing isolation vessel 120 so as to pressurize the releasing isolation vessel 120; transferring the pressure to the coolant within the absorbing isolation vessel 130 through the passage 123 to introduce the coolant into the coolant spray pipe 134; and opening the coolant spray valve 134a by the pressure to spray the coolant to the releasing heat exchanger 121 and the absorbing heat exchanger 131 through the coolant spray pipe 134; and directly cooling the coolant which includes accommodating the coolant generated by condense the steam by the performing of the two-phase heat transfer into the transferring isolation vessel 140; introducing the coolant accommodated in the transferring isolation vessel 140 into the coolant injection pipe 135; and opening the coolant injection valve 135a by the pressure to inject the coolant into the releasing isolation vessel 120 through the coolant injection pipe 135 so that the coolant directly contacts the reactor vessel 112 to perform cooling.

The reactor safety system may further include: a releasing isolation vessel communicating pipe 124 formed to communicate between the upper portion of the releasing isolation vessel 120 and the upper portion of the transferring isolation vessel 140; and a releasing isolation vessel communicating valve 124a provided on the releasing isolation vessel communicating pipe 124, and the operating method for a reactor may further include: leaking the steam generated by the evaporation of the coolant within the reactor vessel 112 to fill the space within the releasing isolation vessel 120 so as to pressurize the releasing isolation vessel 120; and opening the releasing isolation vessel communicating valve 124a by the pressure to release the steam within the releasing isolation vessel 120 to the transferring isolation vessel 140 through the releasing isolation vessel communicating pipe 124 so as to fill and pressurize the space within the transferring isolation vessel 140, such that auxiliary pressurization for opening the coolant injection valve 135a in the direct cooling of the coolant is additionally performed.

The reactor safety system may further include: a releasing isolation vessel pressure reducing pipe 125 formed to communicate between a lower portion of the releasing isolation vessel 120 and a lower portion of the absorbing isolation vessel 130; and a releasing isolation vessel pressure reducing valve 125a provided on the releasing isolation vessel pressure reducing pipe 125, and the operating method for a reactor may further include leaking the steam generated by the evaporation of the coolant within the reactor vessel 112 to fill the space within the releasing isolation vessel 120 so as to pressurize the releasing isolation vessel 120; filling the releasing isolation vessel 120 with the coolant by the direct cooling of the coolant; and opening the releasing isolation vessel pressure reducing valve 125a by the pressure to discharge the coolant within the releasing isolation vessel 120 to the absorbing isolation vessel 130 through the releasing isolation vessel pressure reducing pipe 125, such that the pressure reduction of the overpressure formed within the releasing isolation vessel 120 is additionally performed.

The reactor safety system may further include a steam bypass pipe 126 having one end communicating with the steam pipe 114 and the other end communicating with the releasing heat exchange channel 122 to distribute the steam generated by the evaporation of the coolant within the steam generator 113 to the releasing heat exchange channel 122; and a steam bypass valve 126a provided on the steam bypass pipe 126, and the operating method for a reactor may further include pressurizing the space within the steam generator 113 by the steam generated by the evaporation of the coolant within the steam generator 113; and opening the steam bypass valve 126a by the pressure to introduce the steam within the steam generator 113 into the releasing heat exchange channel 122 through the steam bypass pipe 126, such that the steam auxiliary introduction into the releasing heat exchange channel 122 is additionally performed.

The reactor safety system may further include a steam release pipe having one end communicating with the steam pipe 114 and the other end communicating with the space within the releasing isolation vessel 120 to release the steam generated by the evaporation of the coolant within the reactor vessel 112 to the space within the releasing isolation vessel 120 and a steam release valve 127a provided on the steam release pipe, and the operating method for a reactor may further include pressurizing the space within the steam generator 113 by the steam generated by the evaporation of the coolant within the steam generator 113; and opening the steam release valve 127a by the pressure to release the steam within the steam generator 113 to the space within the releasing isolation vessel 120 through the steam release pipe, such that the auxiliary pressurization within the releasing isolation vessel 120 may be additionally performed.

The reactor safety system may further include a coolant supplement pipe 136 having one end communicating with the releasing heat exchange channel 122 and the other end communicating with a space under the surface of the coolant within the absorbing isolation vessel 130 or the transferring isolation vessel 140 to supplement the coolant to the releasing heat exchange channel 122 and a coolant supplement valve 136a provided on the coolant supplement pipe 136, and the operating method for a reactor may further include opening the coolant supplement valve 136a by the pressure to introduce the coolant into the releasing heat exchange channel 122 through the coolant supplement pipe 136, such that the auxiliary introduction of the coolant into the releasing heat exchange channel 122 may be additionally performed.

The reactor safety system may further include an auxiliary waste heat removing part 150 which includes an auxiliary absorbing heat exchanger 151 disposed within the absorbing isolation vessel 130, an auxiliary condensing heat exchanger 153 disposed outside the isolation vessels, and an auxiliary absorbing heat exchange channel 152 connected to the auxiliary absorbing heat exchanger 151 and the auxiliary condensing heat exchanger 153 to circularly distribute the coolant, and the operating method for a reactor may further include removing auxiliary waste heat which includes absorbing, by a coolant within the auxiliary absorbing heat exchanger 151, heat from the coolant within the absorbing isolation vessel 130, introducing the coolant within the auxiliary absorbing heat exchanger 151 into the auxiliary condensing heat exchanger 153 through the auxiliary absorbing heat exchange channel 152, releasing, the coolant within the auxiliary condensing heat exchanger 153, heat to external environment, and reintroducing the coolant within the auxiliary condensing heat exchanger 153 into the auxiliary absorbing heat exchanger 151 through the auxiliary absorbing heat exchange channel 152 to be circulated.

Other features and aspects will be apparent from the following detailed description, the drawings, and the claims.

DETAILED DESCRIPTION OF MAIN ELEMENTS

Figure 1:
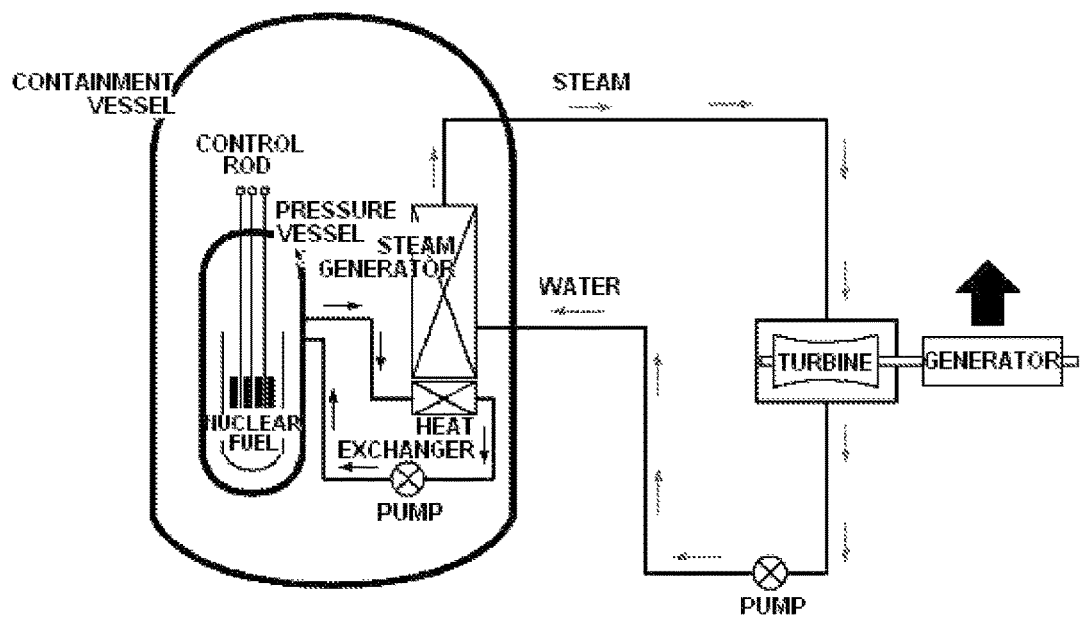
FIG. 1 is a diagram illustrating a typical nuclear power generation principle.
Figure 2:
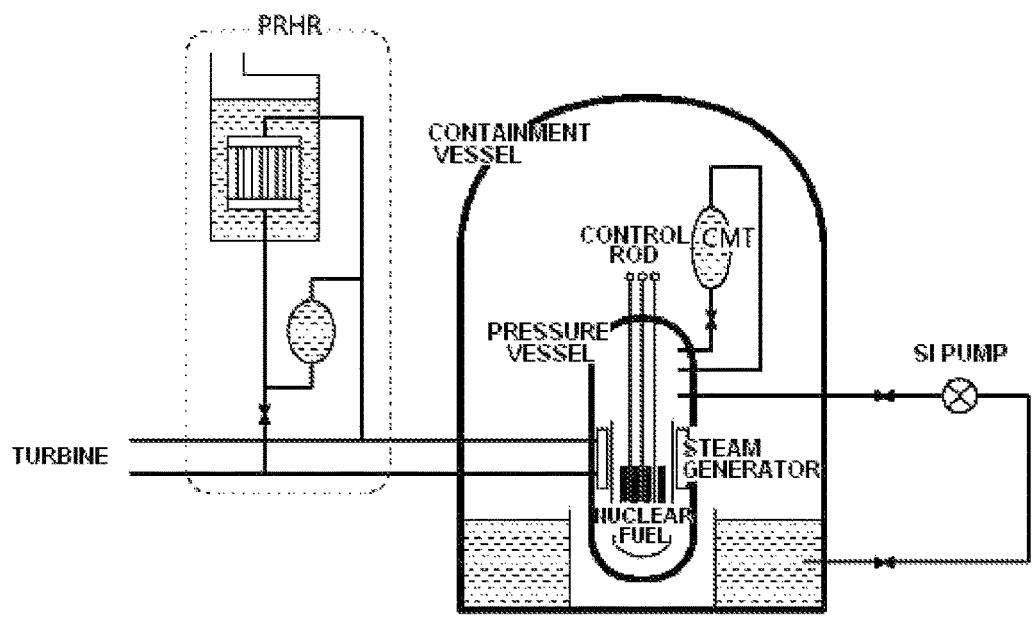
FIG. 2 is a diagram illustrating various examples of the existing safety system.

100: (The inventive) reactor
111: Reactor core
112: Reactor vessel
113: Steam generator
114: Steam pipe
114a: Steam pipe isolation valve
115: Water supply pipe
115a: Water supply pipe isolation valve
120: Releasing isolation vessel
121: Releasing heat exchanger
122: Releasing heat exchange channel
122a: Reactor safety valve
123: Passage
123a: Releasing isolation vessel barrier
123b: Absorbing isolation vessel barrier
124: Releasing isolation vessel communicating pipe
124a: Releasing isolation vessel communicating valve
125: Releasing isolation vessel pressure reducing pipe
125a: Releasing isolation vessel pressure reducing valve
126: Steam bypass pipe
126a: Steam bypass valve
127: Steam release pipe
127a: Steam release valve
128: Water supply supplement pipe
128a: Water supply supplement valve
130: Absorbing isolation vessel
131: Absorbing heat exchanger
132: Absorbing heat exchange channel
133: Condensing heat exchanger
134: Coolant spray pipe
134a: Coolant spray valve
135: Coolant injection pipe
135a: Coolant injection valve
136: Coolant supplement pipe
136a: Coolant supplement valve
140: Transferring isolation vessel
141: Accommodating barrier
150: Auxiliary waste heat removing part
151: Auxiliary absorbing heat exchanger
152: Auxiliary condensing heat exchanger
153: Auxiliary absorbing heat exchange channel

DETAILED DESCRIPTION OF EMBODIMENTS

Hereinafter, a reactor and an operating method for the reactor according to an exemplary embodiment of the present invention having the above-mentioned configuration will be described in detail with reference to the accompanying drawings.

Figure 3:
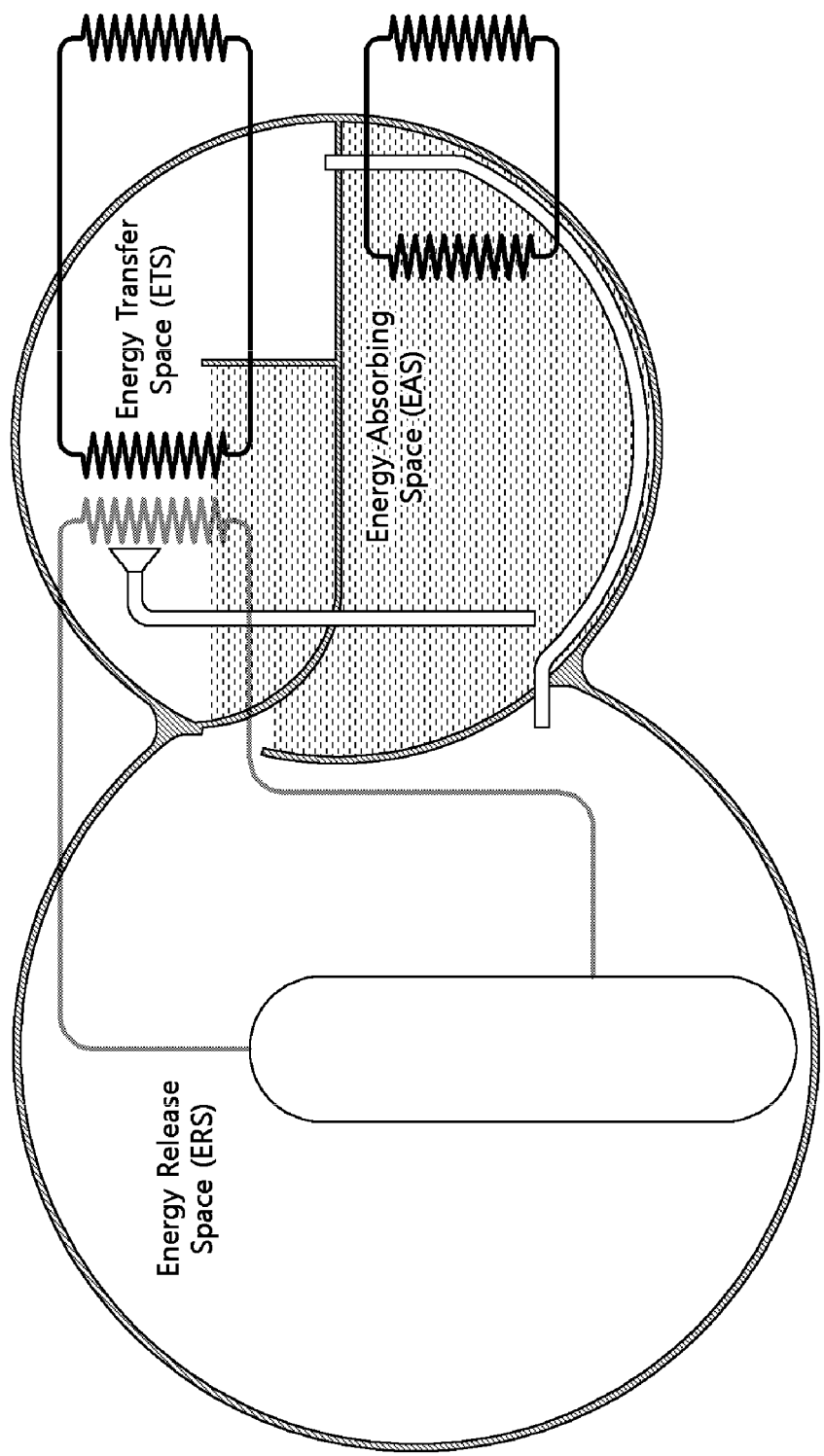
FIG. 3 is a conceptual diagram of a structure of a reactor according to an exemplary embodiment of the present invention.
Figure 4A:
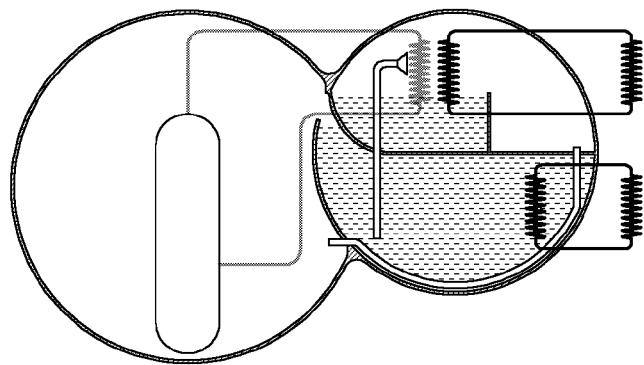
FIGS. 4A, 4B, 4C are diagrams illustrating an operation principle of the reactor according to the exemplary embodiment of the present invention.
Figure 4B:
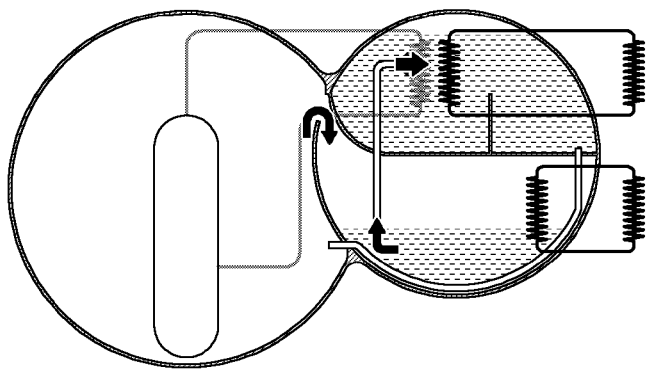
Figure 4C:
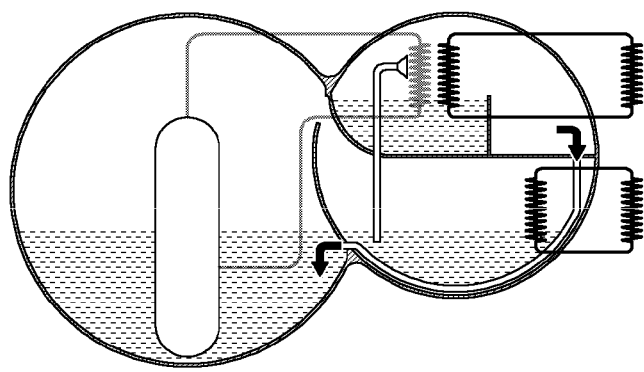

FIG. 3 is a conceptual diagram of a structure of a reactor according to an exemplary embodiment of the present invention and FIGS. 4A, 4B, and 4C are diagrams illustrating an operation principle of the conceptual reactor according to the exemplary embodiment of the present invention as illustrated in FIG. 3.

The reactor according to the exemplary embodiment of the present invention has a reactor safety system which may quickly and effectively perform cooling when a reactor driving system stops due to accidents, etc. Therefore, the reactor driving system according to the exemplary embodiment of the present invention may be configured in any form. Describing in detail, the reactor driving system may be a reactor driving system having a form which is generally used in a large reactor, that is, a form in which a reactor vessel accommodating a reactor core and a steam generator are separately provided while being spaced apart from each other or a form which is used in a small reactor, that is, a reactor driving system in which the steam generator is integrally accommodated in the reactor vessel. Whatever form the reactor driving system takes (that is, independent of the driving system for the large reactor or the small reactor), the reactor driving system basically includes the reactor vessel accommodating the reactor core and the steam generator to which a steam pipe and a water supply pipe are connected.

As illustrated in FIG. 3, the reactor safety system according to the exemplary embodiment of the present invention is largely divided into an energy release space (ERS), an energy absorbing space (EAS), and an energy transfer space (ETS). The energy release space (ERS) accommodates the reactor driving system and the energy absorbing space (EAS) accommodates a coolant. As illustrated, the energy absorbing space (EAS) is configured to communicate with the energy release space (ERS) by a passage which is formed thereover. Further, the energy transfer space (ETS) is configured to be isolated from the energy release space (ERS) and the energy absorbing space (EAS). The energy transfer space (ETS) has a heat exchange device which is connected to the energy release space (ERS) and the energy absorbing space (EAS), respectively, to transfer heat released from the reactor driving system to the coolant.

The reactor safety system according to the exemplary embodiment of the present invention is configured to selectively distribute the coolant within the reactor safety system in response to thermal-hydraulic conditions changed depending on a change in pressure within the reactor driving system and whether the coolant is leaked, to thereby cool the reactor driving system. An operation principle of the conceptual configuration of the reactor according to the exemplary embodiment of the present invention will be described in more detail with reference to FIG. 4A, 4B or 4C.

FIG. 4A is a diagram illustrating a normal state of the conceptual configuration of the reactor according to the exemplary embodiment of the present invention as illustrated in FIG. 3. When the reactor is normally operated, there is no need to additionally cool the reactor, such that the reactor is maintained in the state of FIG. 4A. That is, in this case, the coolant does not move in the energy absorbing space (EAS) and the energy transfer space (ETS).

FIG. 4B illustrates the movement of the coolant in the state in which the reactor stops due to accidents, etc., and thus starts to release overheat. First, as illustrated in FIG. 4B, when the pressure within the energy release space (ERS) is increased due to the overheat of the reactor driving system (in this case, pressurization may be made only by air within the energy release space (ERS) or when the coolant is leaked in the reactor driving system, more pressurization may be made by steam generated by the evaporation of the leaked coolant), the coolant within the energy absorbing space (EAS) is pressurized through the passage formed over the energy release space (ERS). Therefore, as illustrated by an arrow, the coolant within the energy absorbing space (EAS) is supplied to the energy transfer space (ETS). Meanwhile, in the heat exchange device within the energy transfer space (ETS), a heat exchanger which is connected to the reactor driving system within the energy release space (ERS) and a heat exchanger which is provided within the energy transfer space (ETS) are adjacently provided to each other to exchange heat therebetween. Further, the coolant within the energy absorbing space (EAS) is supplied to the heat exchange device, such that the heat exchange in the heat exchange device is faster. (This is based on the two-phase heat transfer principle which will be described below in more detail) That is, in the case of FIG. 4B, indirect cooling of the reactor driving system is performed while the coolant moves from the energy absorbing space (EAS) to the energy transfer space (ETS).

FIG. 4C illustrates the movement of the coolant in the state in which overheat is more generated and thus sufficient cooling may not be made only by the indirect cooling as illustrated in FIG. 4B. As illustrated in FIG. 4B, if the cooling of the reactor driving system is continued to be performed while the coolant moves from the energy absorbing space (EAS) to the energy transfer space (ETS), a level of the coolant within the energy transfer space (ETS) continuously rises over time and a level of the coolant within the energy absorbing space (EAS) continuously falls. In this case, when the level of the coolant within the energy transfer space (ETS) rises beyond a certain level, the coolant within the energy transfer space (ETS) moves to the energy release space (ERS) as illustrated in FIG. 4C. The coolant moving to the energy release space (ERS) directly contacts the reactor driving system, such that the coolant may directly absorb heat from the reactor driving system. That is, in the case of FIG. 4C, the direct cooling of the reactor driving system is performed while the coolant moves from the energy transfer space (ETS) to the energy release space (ERS).

As described above, in the case of FIGS. 4B and 4C, the heat released from the reactor driving system is transferred to the coolant, such that the cooling of the reactor driving system may be performed. As such, according to the exemplary embodiment of the present invention, the cooling of the reactor driving system is performed by appropriately moving the coolant within the reactor safety system between the respective spaces depending on the thermal-hydraulic conditions such as the change in pressure in the reactor driving system and whether the coolant is leaked, and the change in pressure in the respective spaces and the level of the coolant which are changed depending thereon.

Figure 5:
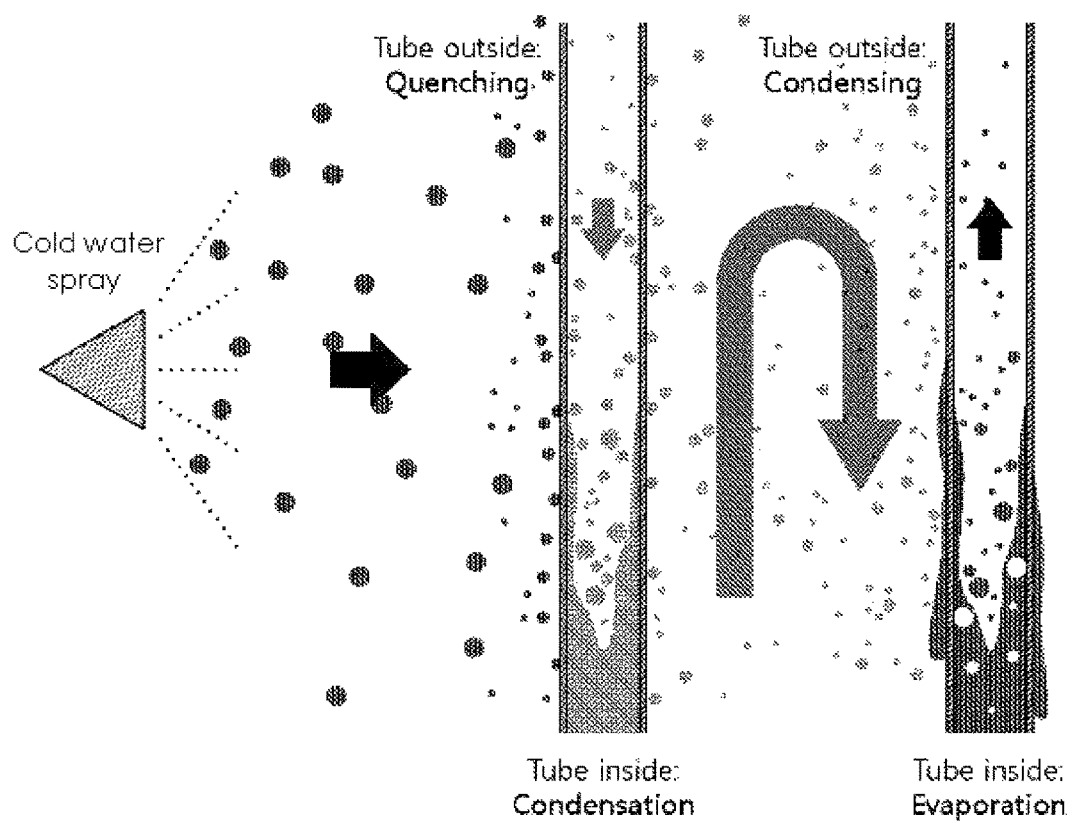
FIG. 5 is a diagram illustrating a two-phase heat transfer principle of the reactor according to the exemplary embodiment of the present invention.

Here, in the reactor according to the exemplary embodiment of the present invention, a heat transfer is performed using, in particular, a two-phase heat transfer mechanism. FIG. 5 is a diagram for describing a principle of the two-phase heat transfer mechanism which is used in the reactor according to the exemplary embodiment of the present invention.

A basic heat exchange principle in most of the existing heat exchangers is to pass a heat exchange medium through a channel isolated from the outside and directly exchange heat between a heat exchange medium in the channel and another heat exchange medium outside the channel, having a wall surface of the channel provided therebetween, thereby performing the heat transfer. That is, for example, an air cooling type heat exchanger form which is configured to make high-temperature cold water flow inside the channel and make low-temperature air flow outside the channel to allow the low-temperature air to absorb the heat of the high-temperature cold water has been most widely used. As another example, a heterogeneous heat exchanger form which is configured to make high-temperature oil flow in one side thereof and the low-temperature cold water flow in the other side thereof to allow the low-temperature cool to absorb the heat of the high-temperature oil has been widely used as well. The heat exchange device according to the exemplary embodiment of the present invention exchanges heat depending on an entirely different principle therefrom.

As illustrated in FIG. 5, the heat exchange device according to the exemplary embodiment of the present invention using the two-phase heat transfer mechanism basically includes a releasing tube (left tube in FIG. 5) in which the high-temperature heat exchange medium flows, an absorbing tube (right tube in FIG. 5) in which the low-temperature heat exchange medium flows, and a nozzle through which other heat exchange media (cold water in FIG. 5 or other liquids) are sprayed to the two tubes.

The high-temperature heat exchange medium flows in the releasing tube and the low-temperature heat exchange medium flows in the absorbing tube. In the case of the existing heat exchanger, the two tubes adhere to each other to transfer heat from a high temperature side to a low temperature side through a wall surface of the tube. However, in the heat exchange device according to the exemplary embodiment of the present invention using the two-phase heat transfer mechanism, unlike the configuration of the two tubes of the existing heat exchanger, the two tubes are spaced apart from each other at an appropriate interval.

The nozzle is provided at the releasing tube side to spray the cold water into the releasing tube. If the cold water is sprayed and water drops thereof approach or contact an outer surface of the releasing tube, the water drops of the cold water instantly absorb heat of the high-temperature heat exchange medium within the releasing tube and thus are quickly evaporated. That is, the water drops of the cold water quickly absorb a large amount of evaporation heat at an outer surface of the releasing tube and thus tube outside quenching happens and the high-temperature heat exchange medium is released while the heat thereof being taken away as the evaporation heat of the water drops of the cold water inside the releasing tube and thus tube inside condensation happens.

As described above, the cold water around the releasing tube is completely evaporated and becomes a steam state. The steam contacts the absorbing tube which is spaced apart from the releasing tube. In this case, since the low-temperature heat exchange medium flows in the absorbing tube, if the steam approaches or contacts the outer surface of the absorbing tube, the heat of the steam is instantly taken away to the low-temperature heat exchange medium within the absorbing tube and thus the steam is condensed, such that the steam is formed at the outer surface of the absorbing tube. That is, since the heat of the steam is taken away to the low-temperature heat exchange medium at the outer surface of the absorbing tube, the steam is condensed and thus becomes condensed water, such that tube outside condensing happens and the low-temperature heat exchange medium absorbs heat from the steam inside the absorbing tube, such that tube inside evaporation happens.

As such, in the two-phase heat transfer mechanism, the heat exchange medium (cold water in an example of FIG. 5) sprayed from the nozzle performs the heat transfer while being changed to gas phase—liquid phase in such a manner that the releasing tube and the absorbing tube are spaced apart from each other and the heat exchange medium is sprayed in a liquid phase, evaporated near the releasing tube to be in a gas phase, and condensed near the absorbing tube and again returns to the liquid phase. A research result of the two-phase heat transfer scheme to transfer heat even faster and more effectively than the existing heat transfer scheme has been published recently.

The safety system according to the exemplary embodiment of the present invention uses the two-phase heat transfer scheme to allow the coolant to absorb heat, thereby realizing the cooling faster and more efficiently than the existing reactor safety system.

Figure 6:
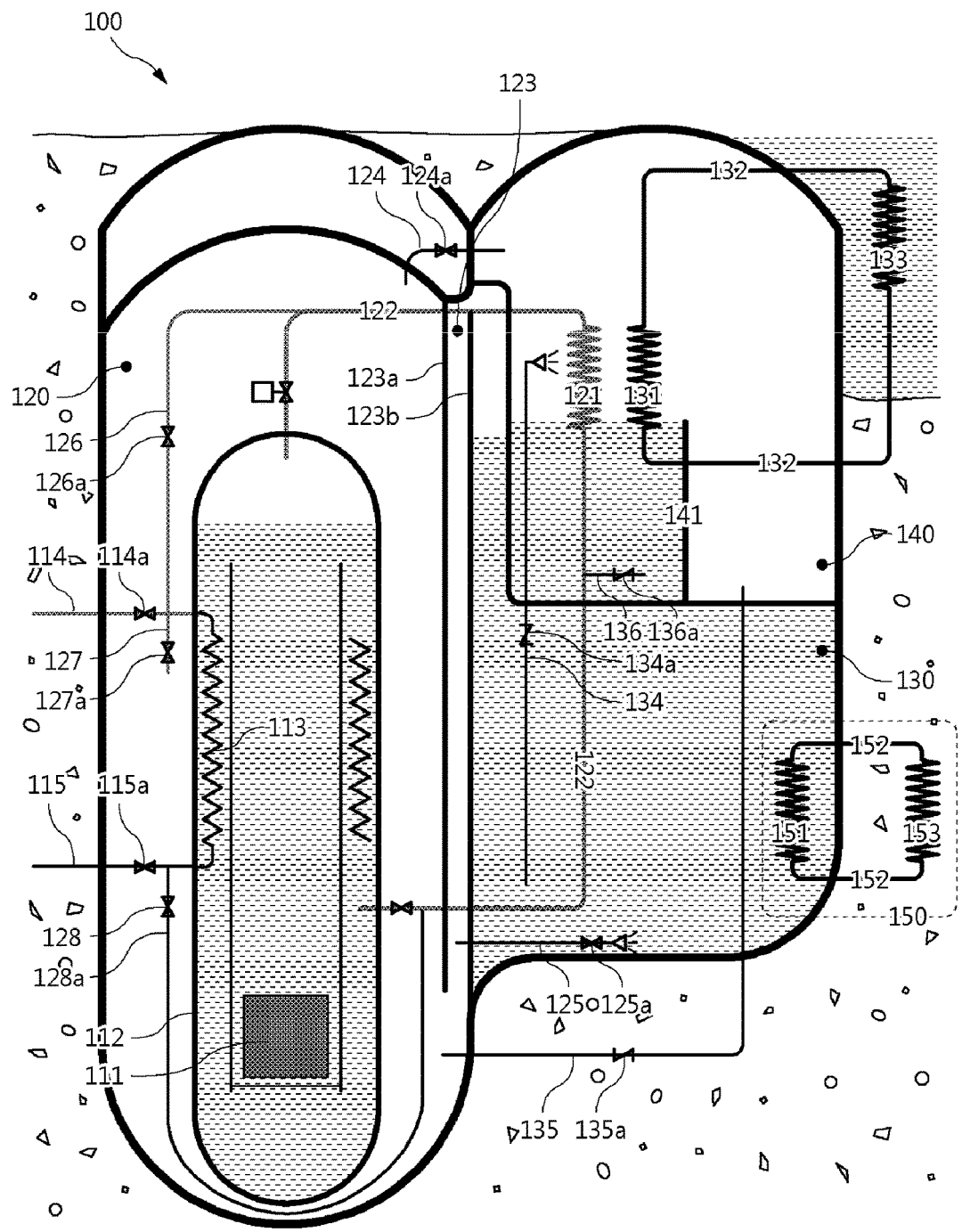
FIG. 6 is a diagram illustrating the reactor according to the exemplary embodiment of the present invention.

The conceptual configuration and principle of the present invention has been described with reference to FIGS. 3 to 5. Hereinafter, the reactor according to the exemplary embodiment of the present invention will be described below in more detail. FIG. 6 is a diagram illustrating the reactor according to the exemplary embodiment of the present invention. As illustrated in FIG. 6, the reactor according to the exemplary embodiment of the present invention is also configured to include the reactor driving system and the reactor safety system.

Reactor Driving System

The reactor driving system is configured to include a reactor vessel 112 accommodating a reactor core 111 and a steam generator 113 to which a steam pipe 114 and a water supply pipe 115 are connected. As described above, the steam generator may be integrally formed within the reactor vessel or the steam generator may be provided outside the reactor vessel. Therefore, the reactor driving system is not limited to the illustrated form but may be formed in any form. An operation of each part of the reactor driving system will be described below in more detail.

The reactor core 111 is a core part of the reactor and is a part of causing the nuclear fission in which an atomic nucleus of nuclear fuel is split into two by being combined with a neutron to generate heat energy. That is, generally, the reactor core 111 is called a bundle of fuel rods which is nuclear fuel of the reactor. Further, generally, the reactor core 111 includes a reactor output control rod, in which the reactor output control rod is vertically movably inserted into the reactor core 111 to control how much the nuclear fission of the nuclear fuel is made depending on the inserted degree of the reactor output control rod, and thus acts to control the output of the reactor 100.

The reactor vessel 112 accommodates the reactor core 111 while being sealed off from the outside. As described above, since the reactor output control rod needs to be controlled to vertically move, a portion of the upper end of the reactor output control rod is generally provided to be exposed outside the reactor vessel 112. In this respect, the reactor core 111 is naturally disposed under the reactor vessel 112. In this case, the coolant is accommodated in the reactor vessel 112 and thus the heat energy generated from the reactor core 111 is absorbed into the coolant. The coolant absorbs the heat energy generated from the reactor core 111 to act to cool the reactor core 111 and transfers the heat absorbed by the coolant to the outside, thereby generating power (hereinafter, which will be described below in more detail in the steam generator 113). As the coolant, cold water, that is, water is generally used. Although described below in more detail, the heat exchange media distributed in each part may be mixed due to the opening of a circulation channel which is in a closed state at ordinary times, etc., when the reactor safety system is operated, and therefore the heat exchange medium or the coolant which is used in each part of the reactor is generally used as the cold water.

The steam generator 113 is formed in the heat exchanger form and is provided inside the reactor vessel 112. The coolant operated as the heat exchange medium is distributed inside the steam generator 113 and the steam generator 113 is supplied with heat from the coolant inside the reactor vessel 112 around the steam generator 113. Therefore, the coolant distributed inside the steam generator 113 absorbs heat and the evaporation happens. As such, the coolant which is in the high-temperature, high-pressure gas phase is released to the steam pipe 114 to operate a turbine. After the turbine is operated, the condensed coolant is again supplied to the steam generator 113 through the water supply pipe 115 and thus is circulated. The steam pipe 114 and the water supply pipe 115 are each provided with a steam pipe isolation valve 114*a* and a water supply pipe isolation valve 115*a* and thus are blocked from the outside at the time of an emergency situation.

As such, when the reactor is normally operated, the coolant inside the reactor vessel 112 is naturally circulated. This will be described below in more detail. When the heat energy generated from the reactor core 111 is absorbed into the coolant, the high-temperature coolant rises. When the high-temperature coolant reaches the steam generator 113 which is disposed over the reactor core 111, the coolant within the steam generator 113 and the high-temperature coolant exchange heat with each other. That is, the coolant within the steam generator 113 absorbs heat from the high-temperature coolant. Therefore, the high-temperature coolant has the reduced temperature while passing through the steam generator 113, and thus falls. The falling coolant again absorbs the heat energy generated from the reactor core 111, such that the natural circulation convection is made.

The foregoing reactor driving system may be commonly included in the existing large or small (integrated) reactor. The driving system configured as described above is operated and thus the reactor produces power. When the reactor is normally operated, the operation of the reactor has no problem only by the driving system. However, if the reactor vessel 112 is damaged and thus the coolant within the reactor vessel 112 is leaked, the heat energy generated from the reactor core 111 may not be absorbed into a sufficient amount of coolant. Therefore, the temperature around the reactor core 111 excessively rises and thus more serious damage such as melting of parts may occur. The reactor has a great effect on environment such as radioactivity leakage and therefore safety is important above all. Therefore, if the coolant is leaked due to the damage of the reactor vessel 112, a safety system to quickly cool the reactor vessel 112, etc., is essential.

As described above, if the safety system is operated only when receiving a separate control command such as an operator's manipulation, the operator of the reactor does not issue a command in time at the time of the occurrence of accidents under the conditions that he/she is absent, wounded, or the like. Therefore, the danger of the accident is terribly increased. Further, even in the case of the system which is automatically controlled by an electron control, etc., when the safety system is damaged due to the high heat generated due to the damage of the reactor, the safety system may not be correctly operated. Therefore, when the reactor is damaged and the coolant is leaked, a passive safety system which is mechanically operated upon the change in physical environment is necessarily provided. Of course, many studies on the passive safety system have been conducted before. However, the existing passive safety system has the following problems.

First, since the existing passive safety systems have a considerably large volume, there are many restrictions in construction and economy. As a result, considerable resources such as time and manpower are consumed to design the safety systems for overcoming the above problems. In particular, in the case of the small reactor of which the demand has been gradually expanded recently, if the existing passive safety system is applied to the small reactor, the small reactor may not obtain the sufficient cooling efficiency and thus the difficulty in designing the small reactor may be increased. Therefore, resources such as a space, a material, and costs may be more wasted during the actual construction of the reactor and resources such as time, manpower, and costs consumed for maintenance, etc., cannot but be more wasted even during the operation of the constructed reactor.

To solve the above problems, the exemplary embodiment of the present invention may appropriately cope with the various occurrence situations of accidents of reactors using one system and may configure the safety systems (that is, devices for cooling a reactor) in completely passive type and thus there is no need for the separate control command of the operator. As a result, the fast cooling may be made when the reactor is damaged. In particular, unlike the existing reactor, the reactor according to the exemplary embodiment of the present invention mostly uses the two-phase heat transfer scheme to perform the cooling and performs the cooling while the coolant appropriately moves within the containment vessel divided into several spaces at the time of the occurrence of accidents to perform the faster and more efficient cooling than before. In addition, the safety system according to the exemplary embodiment of the present invention has a configuration much simpler than that of the existing passive safety system to greatly reduce the volume of the reactor, such that it is very suitable for the small reactor of which the demand has been gradually expanded recently.

Reactor Safety System

In FIG. 6, the reactor safety system is configured to include a releasing isolation vessel 120, a releasing heat exchanger 121, a releasing heat exchange channel 122, an absorbing isolation vessel 130, an absorbing heat exchanger 131, an absorbing heat exchange channel 132, a condensing heat exchanger, a coolant spray pipe 134, and a transferring isolation vessel 140. In this configuration, the releasing isolation vessel 120 forms the energy release space (ERS) in the conceptual configuration of FIG. 3, the absorbing isolation vessel 130 forms the energy absorbing space (EAS) in the conceptual configuration of FIG. 3, and the transferring isolation vessel 140 forms the energy transfer space (ETS) in the conceptual configuration of FIG. 3. Further, the releasing heat exchanger 121, the absorbing heat exchanger 131, and the coolant spray pipe 134 are combined to form the heat exchange device in the conceptual configuration of FIG. 3.

The indirect cooling based on the scheme as illustrated in FIG. 4B may be performed only by the above configuration. In addition, to perform the direct cooling based on the scheme as illustrated in FIG. 4C, the reactor safety system is configured to further include the coolant injection pipe 135. Further, to more smoothly move the coolant between the respective components of the reactor safety system, the reactor safety system may further include several additional components. Hereinafter, the connection relationship between the respective components will be first described. Next, how the respective components are operated in some cases will be described in detail with reference to the embodiment of the indirect cooling operating method of FIG. 7 and the embodiment of the direct cooling operating method of FIG. 8.

The releasing isolation vessel 120 accommodates gas and the reactor driving system as illustrated and forms the energy release space (ERS) as described above.

The absorbing isolation vessel 130 accommodates the coolant as illustrated and forms the energy absorbing space (EAS) as described above. The absorbing isolation vessel 130 communicates with the releasing isolation vessel 120 through a passage 123 which is formed over the releasing isolation vessel 120. In this case, as illustrated in FIG. 6, the passage 123 may be formed in a double barrier form in which a releasing isolation vessel barrier 123*a* is formed at the releasing isolation vessel 120 and has an upper portion opened and an absorbing isolation vessel barrier 123*b* is formed at the absorbing isolation vessel 130 and has a lower portion opened. By the configuration, it is possible to prevent the coolant within the absorbing isolation vessel 130 from unnecessarily passing to the releasing isolation vessel 120 and freely distribute air or steam.

The transferring isolation vessel 140 is provided over the absorbing isolation vessel 130 as illustrated to accommodate the gas and the coolant and forms the energy transfer space (ETS) as described above. The transferring isolation vessel 140 includes the heat exchange device (hereinafter, the heat exchange device including the releasing heat exchanger 121, the absorbing heat exchanger 132, and the coolant spray pipe 134 which will be described below) for transferring heat released from the reactor driving system to the coolant and the heat exchange device uses the two-phase heat transfer mechanism as described above to transfer heat. In this case, the condensed water, that is, the condensed coolant essentially falls down the heat exchange device. To prevent the coolant from being unnecessarily introduced into the energy release space (ERS), as illustrated in FIG. 6, the inside of the transferring isolation vessel 140 is provided with an accommodating barrier 141 enclosing an area in which the releasing heat exchanger 121 and the absorbing heat exchanger 131 are disposed, such that the transferring isolation vessel 140 may accommodate the cold water.

Further, as illustrated in FIG. 3 or 6, the energy absorbing space (EAS) and the energy transfer space (ETS) may be preferably formed in a form in which one space is vertically divided. Further, in the direct cooling scheme which is conceptually described in FIG. 4B, the coolant filled in the energy transfer space (ETS) is directly introduced into the energy release space (ERS). In this case, as the energy transfer space (ETS) is positioned high, the coolant may flow smoother and smoother, and therefore the position of the energy transfer space (ETS) may be preferably formed higher than the position of the energy release space (ERS) as commonly illustrated in FIG. 3 or 6.

The releasing heat exchanger 121 and the absorbing heat exchanger 131 are adjacently disposed to each other within the transferring isolation vessel 140 to exchange heat with each other. The coolant spray pipe 134 is configured to inject the coolant into the releasing heat exchanger 121 and the absorbing heat exchanger 131 which are adjacently disposed to each other, thereby forming the heat exchange device in the conceptual configuration of FIG. 3. By this configuration, the coolant sprayed from the coolant spray pipe 134 absorbs heat from the coolant distributed within the releasing heat exchanger 121 to be evaporated and the coolant distributed within the absorbing heat exchanger 131 absorbs the heat of the steam generated by the evaporation of the coolant to be condensed and is formed to be accommodated into the transferring isolation vessel 140, such that the heat transfer may be made by the two-phase heat transfer mechanism for transferring heat from the coolant within the releasing heat exchanger 121 to the coolant within the absorbing heat exchanger 131 by the evaporation and the condensing of the coolant sprayed by the coolant spray pipe 134.

As such, the heat exchange device configured to include the releasing heat exchanger 121, the absorbing heat exchanger 131, and the coolant spray pipe 134 is a connection component for absorbing the heat of the reactor driving system and discarding the absorbed heat to the coolant. As illustrated in FIG. 6, the heat exchange device further includes a condensing heat exchanger 133 disposed in the external environment of the isolation vessels, the releasing heat exchange channel 122 connected to the reactor vessel 112 and the releasing heat exchanger 121 to circulate and distribute the coolant, and the absorbing heat exchange channel 132 connected to the absorbing heat exchanger 131 and the condensing heat exchanger 133 to circulate and distribute the coolant.

Meanwhile, only if the reactor safety system performs the cooling only by the heat transfer using the two-phase heat transfer mechanism, that is, if the cooling may be made only by the indirect cooling scheme of FIG. 4B described above, the coolant spray pipe 134 may be supplied with the coolant from other places. In this case, the difficulties in design happen. Therefore, to rule out the difficulties in design and use the direct cooling scheme of FIG. 4C, the coolant spray pipe 134 has one end communicating with the absorbing isolation vessel 130 to be supplied with the coolant and the other end provided with the nozzle to spray the supplied coolant to the releasing heat exchanger 121 and the absorbing heat exchanger 131 and is preferably provided with a coolant spray valve 134a.

Further, for the reactor safety system to perform the cooling using the direct cooling scheme of FIG. 4C, a passage through which the coolant is released from the energy transfer space (ETS) to the energy release space (ERS) is required. To this end, the reactor safety system further includes a coolant injection pipe 135 which has one end communicating with the transferring isolation vessel 140 and the other end communicating with the releasing isolation vessel 120 to inject the coolant accommodated in the transferring isolation vessel 140 into the releasing isolation vessel 120 and a coolant injection valve 135a provided on the coolant injection pipe 135.

Hereinafter, how the respective components are operated in some cases will be described in detail with reference to the indirect cooling operating method of FIG. 7 and the direct cooling operating method of FIG. 8. Further, added components will be described while an auxiliary operation process is described during the operation.

First Exemplary Embodiment: Indirect Cooling Scheme

In operating the reactor configured as described above, first, the indirect cooling scheme as schematically described in FIG. 4B may be used. FIG. 7 illustrates an example of the operation state in this case.

First, starting the operation of the reactor safety system means that the reactor driving system is abnormally operated due to the intentional stop of the reactor driving system, the accidents of the reactor, etc. That is, prior to starting the operation of the reactor safety system, isolating which includes stopping the reactor driving system; and closing the steam pipe isolation valve 114a included in the steam pipe 114 and the water supply pipe isolation valve 115a included in the water supply pipe 115 is always performed.

Figure 7:
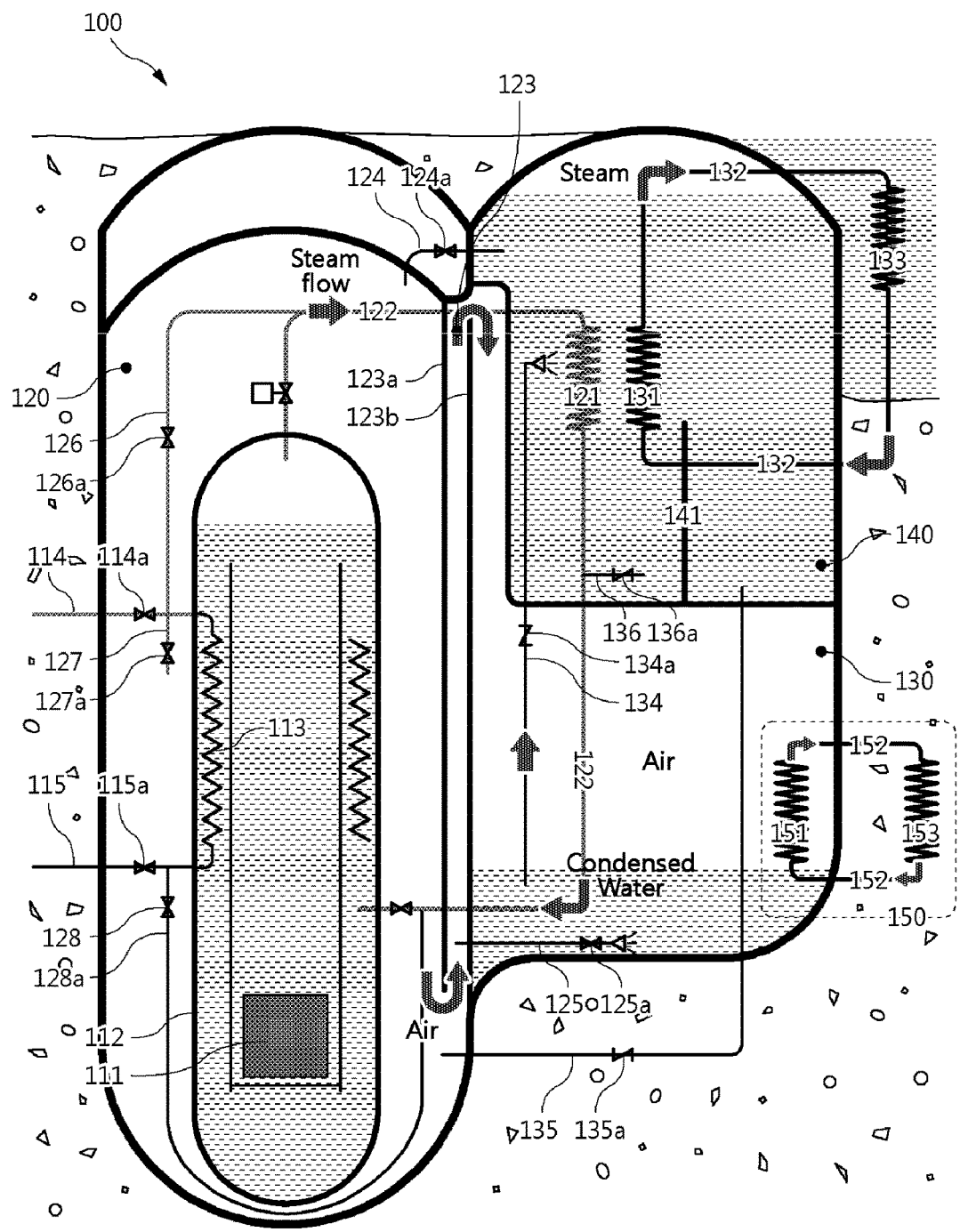
FIG. 7 is a diagram illustrating an operating method for a reactor according to a first exemplary embodiment of the present invention.

In FIG. 7, the actual operation of the reactor safety system includes circulating the releasing heat exchanger, performing the two-phase heat transfer, and circulating the absorbing heat exchanger.

The circulating of the releasing heat exchanger is performed in the following order. First, the steam generated by the evaporation of the coolant within the reactor vessel 112 is introduced into the releasing heat exchanger 121 through the releasing heat exchange channel 122. Next, the steam introduced into the releasing heat exchanger 121 is condensed while passing through the releasing heat exchanger 121 to generate the coolant and the generated coolant is reintroduced into the reactor vessel 112 through the releasing heat exchange channel 122 to be circulated.

The performing of the two-phase heat transfer is performed in the following order. First, the coolant supplied by the coolant spray pipe 134 is sprayed to and contacts the outer surface of the releasing heat exchanger 121. Next, the coolant contacting the outer surface of the releasing heat exchanger 121 absorbs the heat from the steam within the releasing heat exchanger 121 to be evaporated and the steam within the releasing heat exchanger 121 is condensed to generate the coolant. As such, if the steam generated by the evaporation of the coolant at the outer surface of the releasing heat exchanger 121 contacts the outer surface of the absorbing heat exchanger 131, the steam contacting the outer surface of the absorbing heat exchanger 131 releases heat to the coolant within the absorbing heat exchanger 131 and thus is condensed to the coolant and the coolant within the absorbing heat exchanger 131 is evaporated to generate the steam.

The circulating of the absorbing heat exchanger is performed in the following order. First, the steam within the absorbing heat exchanger 131 is introduced into the condensing heat exchanger 133 through the absorbing heat exchange channel 132. Next, the steam introduced into the condensing heat exchanger 133 is condensed while passing through the condensing heat exchanger 133 to generate the coolant and the generated coolant is reintroduced into the absorbing heat exchanger 131 through the absorbing heat exchange channel 132 to be circulated.

That is, the heat of the reactor driving system moves to the releasing heat exchanger by the circulating of the releasing heat exchanger, the heat is exchanged between the releasing heat exchanger and the absorbing heat exchanger by the performing of the two-phase heat transfer to transfer heat to the coolant, the heat of the heat exchange medium (in most cases, made of the same material as the coolant) within the absorbing heat exchanger is discarded to the external environment by the circulating of the absorbing heat exchanger, such that the indirect cooling of the reactor driving system may be performed. In this case, as illustrated, the condensing heat exchanger 133 is included in the heat sink having infinite capacity such as sea water, thereby effectively cooling the heat of the reactor driving system.

Meanwhile, when the cooling is performed by the indirect cooling scheme, reactor vessel 112-releasing heat exchange channel 122-releasing heat exchanger 121 form one isolation circulation space and absorbing heat exchanger 131-absorbing heat exchange channel 132-condensing heat exchanger 133 forms another isolation circulation space. In this case, the isolating is first performed, such that steam pipe 114-steam generator 113-water supply pipe 115 forms another isolation space. However, the isolation spaces in which the releasing heat exchanger or the absorbing heat exchanger is included are configured to have the coolant circulated therein, while the isolation space in which the steam generator is included is merely isolated. In this case, the isolation space in which the steam generator is included is a space which is connected to the external turbine to have the coolant and the steam distributed therein at the time of the normal operation, and therefore the coolant which is confined in the space at the time of the isolation remains. The coolant is also evaporated within the isolation space due to the overheat of the reactor core to be changed to the steam. Here, the steam excessively increases the pressure within the isolation space in which the steam generator is included, and thus the steam generator, etc., may be damaged.

To prevent the problems, the reactor safety system further includes a steam bypass pipe 126 having one end communicating with the steam pipe 114 and the other end communicating with the releasing heat exchange channel 122 to distribute the steam generated by the evaporation of the coolant within the steam generator 113 to the releasing heat exchange channel 122 and a steam bypass valve 126a provided on the steam bypass pipe 126, and the operating method for the reactor may further include the following steps. That is, the operating method for the reactor may further include: pressurizing the space within the steam generator 113 by the steam generated by the evaporation of the coolant within the steam generator 113; and opening the steam bypass valve 126a by the pressure to introduce the steam within the steam generator 113 into the releasing heat exchange channel 122 through the steam bypass pipe 126, such that the steam auxiliary introduction into the releasing heat exchange channel 122 may be additionally performed. By doing so, the steam auxiliary introduction is made, and at the same time it is possible to prevent the pressure within the isolation space including the steam generator 113 from excessively increasing.

Meanwhile, the steam released from the isolation space including the steam generator 113 is condensed in the coolant state while passing through the releasing heat exchanger 121. The coolant returns to the reactor vessel 112 through the releasing heat exchange channel 122 to be supplemented within the reactor vessel 112. However, if the steam released from the space of the steam generator is continued to be merely introduced into the reactor vessel, the steam within the space of the steam generator and the amount of the coolant are insufficient with the passage of time and thus the pressure may be excessively reduced, which makes the state of the reactor instable. Therefore, if the overpressure within the steam generator 113 falls to a proper level, it is preferable to re-supply the coolant to the isolation space including the steam generator 113. To this end, the reactor safety system further includes a water supply supplement pipe 128 having one portion connected to the releasing heat exchange channel 122 and the other portion connected to the water supply pipe 115 to supply the coolant, which is introduced through the releasing heat exchange channel 122, into the steam generator 112. As illustrated, the water supply supplement pipe 128 includes a water supply supplement valve 128a. Further, a valve is also provided between a portion where the condensed coolant flows in the reactor vessel 122 from the releasing heat exchange channel 122 connected to the reactor vessel 122 and a portion to which water supply supplement pipe 128 is connected and valves are opened and closed depending on a proper pressure condition, thereby easily realizing the foregoing operation.

Second Exemplary Embodiment: Direct Cooling Scheme

If the coolant is not leaked in the reactor driving system, that is, if the reactor is not damaged but is in the overheat state due to the slight abnormal operation, it is possible to prevent the overheat damaging the reactor from proceeding only by the cooling of the reactor driving system using the indirect cooling scheme as described above. However, when a loss-of-coolant accident (LOCA) (the accident that the coolant is leaked from the reactor vessel) or a medium and large accident that the reactor core is melted and then is exposed through the reactor vessel occurs, there is a need to perform the cooling faster and more efficiently. In this case, the direct cooling scheme as schematically described in FIG. 4C may be used. FIG. 8 illustrates an example of the operation state in this case.

Figure 8:
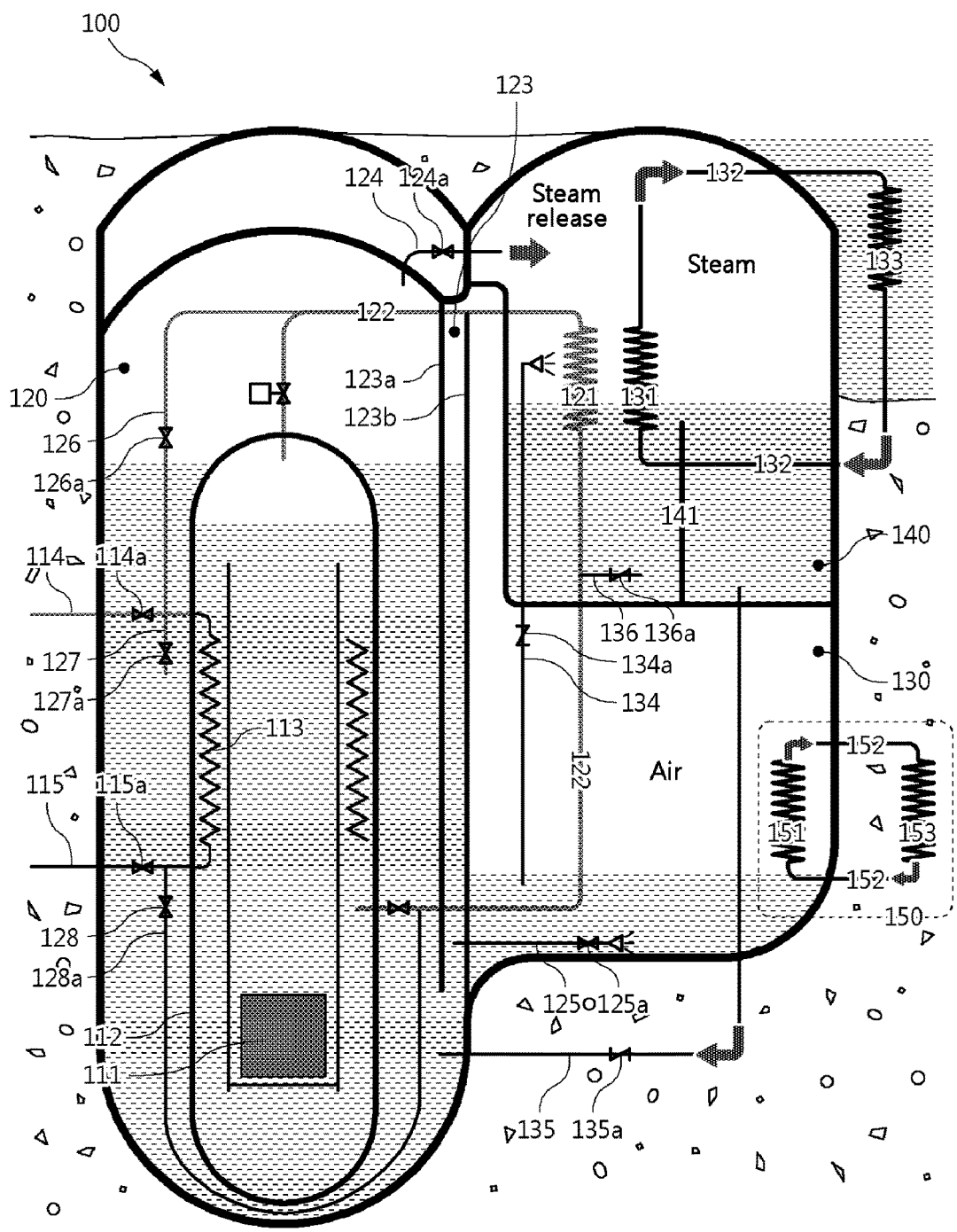
FIG. 8 is a diagram illustrating an operating method for a reactor according to a second exemplary embodiment of the present invention.

The exemplary embodiment of FIG. 8 is performed under the assumption that the exemplary embodiment of FIG. 7, that is, the indirect cooling scheme is first performed. In other words, the exemplary embodiment of FIG. 8 is performed under the assumption that the steps performed in the exemplary embodiment of FIG. 7, that is, the steps of distributing the coolant into the isolation circulation space including the releasing heat exchanger or the absorbing heat exchanger are performed, are performed in advance, or the like.

In the exemplary embodiment of FIG. 8, the operation of the reactor safety system includes pressurizing the releasing isolation vessel 120 and spraying the coolant, and directly cooling by the coolant.

In this case, to perform the exemplary embodiment of FIG. 8, the coolant spray pipe 134 draws the coolant from the absorbing isolation vessel 130 and sprays the drawn coolant. Further, a component to release the coolant from the absorbing isolation vessel 130 to the releasing isolation vessel 120 is additionally required. Describing in more detail, to perform the exemplary embodiment of FIG. 8, first, the coolant spray pipe 134 has one end communicating with the absorbing isolation vessel 130 to be supplied with the coolant and the other end provided with the nozzle to spray the supplied coolant to the releasing heat exchanger 121 and the absorbing heat exchanger 131 and has the coolant spray valve 134a provided thereon. Further, the reactor safety system further includes a coolant injection pipe 135 which has one end communicating with the transferring isolation vessel 140 and the other end communicating with the releasing isolation vessel 120 to inject the coolant accommodated in the transferring isolation vessel 140 into the releasing isolation vessel 120 and a coolant injection valve 135a provided on the coolant injection pipe 135.

The pressurizing the releasing isolation vessel 120 and spraying of the coolant is performed in the following order. First, the steam generated by the evaporation of the coolant within the reactor vessel 112 is leaked and is filled in the space within the releasing isolation vessel 120 to pressurize the releasing isolation vessel 120. Next, the pressure is transferred to the coolant within the absorbing isolation vessel 130 through the path 123 and is thus introduced into the coolant spray pipe 134. Therefore, the coolant spray valve 134a is opened by the pressure, and thus the coolant is sprayed to the releasing heat exchanger 121 and the absorbing heat exchanger 131 through the coolant spray pipe 134, such that the coolant within the absorbing isolation vessel 130 may move to the transferring isolation vessel 140 to be supplied to the heat exchangers.

The directly cooling by the coolant is performed in the following order. As described above, it is on the assumption that the steps in the exemplary embodiment of FIG. 7 proceed in advance, such that the coolant generated by condensing steam by performing the two-phase heat transfer is accommodated within the transferring isolation vessel 140. If the accommodating barrier 141 is formed around the heat exchangers, even though the coolant generated by condensing steam is filled in the transferring isolation vessel 140, the coolant is filled in the accommodating barrier 141 and therefore is not directly introduced into the coolant injection pipe 135. However, after some time lapses, the amount of coolant is increased and thus the level of the coolant is increased, such that the coolant accommodated within the transferring isolation vessel 140 is introduced into the coolant injection pipe 135. In this case, the higher the level of the coolant within the transferring isolation vessel 140, the smaller the size of the empty space, that is, the space filled with gas, such that the pressure within the transferring isolation vessel 140 is increased. Therefore, the coolant injection valve 135a is opened by the pressure and thus the coolant is injected into the releasing isolation vessel 120 through the coolant injection pipe 135. As such, the coolant injected into the releasing isolation vessel 120 directly contacts the reactor vessel 112 to perform the cooling.

In this case, as described above, the pressure within the transferring isolation vessel 140 needs to be increased to a certain level to open the coolant injection valve 135a. Therefore, in order to open the coolant injection valve 135a faster, the following components may further be added.

That is, the reactor safety system may further include a releasing isolation vessel communicating pipe 124 formed to communicate between the upper portion of the releasing isolation vessel 120 and the upper portion of the transferring isolation vessel 140 and a releasing isolation vessel communicating valve 124a provided on the releasing isolation vessel communicating pipe 124. Further, the operating method for the reactor further includes: leaking the steam generated by the evaporation of the coolant within the reactor vessel 112 to fill the space within the releasing isolation vessel 120 so as to pressurize the releasing isolation vessel 120; and opening the releasing isolation vessel communicating valve 124a by the pressure to release the steam within the releasing isolation vessel 120 to the transferring isolation vessel 140 through the releasing isolation vessel communicating pipe 124 so as to fill and pressurize the transferring isolation vessel 140, such that the auxiliary pressurization for opening the coolant injection valve 135a in the direct cooling by the coolant may be additionally performed.

Meanwhile, when the middle and large accident occurs, enormous heat is released within the releasing isolation vessel 120 accommodating the reactor driving system. Therefore, the coolant within the releasing isolation vessel 120 is almost all evaporated at the early stage that the cooling is little performed and thus becomes the steam state, such that the pressure within the releasing isolation vessel 120 is increased. In addition, if the coolant is continued to be injected from the transferring isolation vessel 140, the pressure within the releasing isolation vessel 120 may be excessively increased. To prevent the above problem, the reactor safety system may further include the following components.

That is, the reactor safety system may further include a releasing isolation vessel pressure reducing pipe 125 formed to communicate between a lower portion of the releasing isolation vessel 120 and a lower portion of the absorbing isolation vessel 130 and a releasing isolation vessel pressure reducing valve 125a provided on the releasing isolation vessel pressure reducing pipe 125. Further, the operating method for the reactor further includes: leaking the steam generated by the evaporation of the coolant within the reactor vessel 112 to fill the space within the releasing isolation vessel 120 so as to pressurize the releasing isolation vessel 120; filling the releasing isolation vessel 120 with the coolant by the direct cooling by the coolant; and opening the releasing isolation vessel pressure reducing valve 125a by the pressure to release the coolant within the releasing isolation vessel 120 to the absorbing isolation vessel 130 through the releasing isolation vessel pressure reducing pipe 125, such that the pressure reduction of the overpressure formed within the releasing isolation vessel 120 may be additionally performed.

Meanwhile, all the operations of the safety systems are performed by increasing the pressure within the reactor vessel 112 or the releasing isolation vessel 120. That is, the safety operation for cooling may be performed faster by increasing the pressure within the releasing isolation vessel 120 faster. To this end, the reactor safety system may further include the following components.

That is, the reactor safety system may further include a steam release pipe 127 having one end communicating with the steam pipe 114 and the other end communicating with the space within the releasing isolation vessel 120 to release the steam generated by the evaporation of the coolant within the reactor vessel 112 to the space within the releasing isolation vessel 120 and a steam release valve 127a provided on the steam release pipe. Further, the operating method for the reactor may further include: pressurizing the space within the steam generator 113 by the steam generated by the evaporation of the coolant within the steam generator 113; and opening the steam release valve 127a by the pressure to release the steam within the steam generator 113 to the space within the releasing isolation vessel 120 through the steam release pipe, such that the auxiliary pressurization within the releasing isolation vessel 120 may be additionally performed.

Further, as described above, the reactor safety system according to the exemplary embodiment of the present invention performs the cooling basically using the two-phase heat transfer mechanism. In this case, the coolant and the steam which are originally present in the reactor vessel 112 are circulated within the isolation space including the releasing heat exchanger 131. However, when the coolant is leaked from the reactor vessel 112, the amount of coolant circulated to be used for the cooling may be insufficient. To prevent the above problem, the reactor safety system may further include the following components.

That is, the reactor safety system may further include a coolant supplement pipe 136 having one end communicating with the releasing heat exchange channel 122 and the other end communicating with a space under the surface of the coolant within the absorbing isolation vessel 130 or the transferring isolation vessel 140 to supplement the coolant to the releasing heat exchange channel 122 and a coolant supplement valve 136a provided on the coolant supplement pipe 136. Further, the operating method for the reactor further includes opening the coolant supplement valve 136a by the pressure to introduce the coolant into the releasing heat exchange channel 122 through the coolant supplement pipe 136, such that the auxiliary introduction of the coolant into the releasing heat exchange channel 122 may be additionally performed.

Additional Example: Removal of Auxiliary Waste Heat

As described above, in the reactor safety system according to the exemplary embodiment of the present invention, the coolant performs cooling while moving among the releasing isolation vessel 120, the absorbing isolation vessel 130, and the transferring isolation vessel 140. During the process, the condensing heat exchanger 133 connected to the absorbing heat exchanger 131 is included in the heat sink having infinite capacity like sea water to extend the cooling time infinitely, thereby performing the long-term cooling. However, as described above, the heat is directly absorbed by the coolant circularly moving within the isolation vessels and heat continuously discarded is accumulated in the coolant and thus the temperature of the coolant rises, thereby reducing the cooling speed and performance. Therefore, the reactor safety system according to the exemplary embodiment of the present invention further includes a structure to auxiliarily further cool the coolant within the isolation vessels.

The auxiliary waste heat removing part 150 performs this role and the auxiliary waste heat removing part 150 includes an auxiliary absorbing heat exchanger 151 disposed within the absorbing isolation vessel 130, an auxiliary condensing heat exchanger 153 disposed outside the isolation vessels, and an auxiliary absorbing heat exchange channel 152 connected to the auxiliary absorbing heat exchanger 151 and the auxiliary condensing heat exchanger 153 to circularly distribute the coolant.

In this case, the operating method for the reactor may further include operating the auxiliary waste heat removing part 150, that is, removing the auxiliary waste heat. The removing of the auxiliary waste heat is a substantially completely independent operation and therefore the removing of the auxiliary waste heat may be performed in parallel with all the steps of the operating method for the reactor safety system described above.

The removing of the auxiliary waste heat is performed as follows. First, the coolant within the auxiliary absorbing heat exchanger 151 absorbs heat from the coolant within the absorbing isolation vessel 130. Next, the coolant within the auxiliary absorbing heat exchanger 151 is introduced into the auxiliary condensing heat exchanger 153 through the auxiliary absorbing heat exchange channel 152. Next, the coolant within the auxiliary condensing heat exchanger 153 releases heat to the external environment. In this case, the external environment may be sea water similar to the external environment of the condensing heat exchanger 133 or may be an underground layer, etc., as illustrated. Next, the coolant within the auxiliary condensing heat exchanger 153 is circulated by being reintroduced into the auxiliary absorbing heat exchanger 151 through the auxiliary absorbing heat exchange channel 152.

According to the exemplary embodiments of the present invention, the safety system is completely passively performed to perform the fast cooling without the separate control command at the time of the damage of the reactor, thereby minimizing the accident risk. First of all, the exemplary embodiment of the present invention may have the new structure based on the thermal-hydraulic operation concept completely different from the existing passive reactor safety system and variously perform the appropriate cooling operation to meet various accident conditions based on the new structure. In particular, the configuration of the reactor safety system according to the exemplary embodiment of the present invention has a much simpler structure than the typical reactor safety system, such that it is possible to much reduce the difficulty in designing and constructing the reactor than the existing reactor and it is possible to improve the easiness and convenience beyond compare even in operating the constructed reactor. As a result, it is possible to greatly save the resources such as time, manpower, and costs consumed for the design, the construction, the operation, the control, etc.

Further, the configuration of the reactor safety system according to the exemplary embodiment of the present invention is different from that of the existing reactor safety system and quickly absorbs the high-temperature energy of the reactor using the two-phase heat transfer scheme unlike the existing reactor safety system to discard the high-temperature energy to the outside (heat sink such as sea water) so as to make the cooling speed remarkably fast, thereby greatly improving the absolute cooling ability. Further, the heat absorbed into the coolant acting as the heat sink is discarded to the outside, that is, the infinite heat sink once more, such that the residual heat removal time may be extended infinitely.

In addition, there is no active control means (operated by receiving the control command issued by the operator from the outside) in performing the cooling operation and the general structure itself is much simpler, thereby more improving the convenience of manufacturing, operation, etc, than before. Further, the economical effect of saving the unnecessary energy waste during the operation may be achieved since the separate power source required for the active control or driving is not required. In addition, according to the exemplary embodiment of the present invention, the shape of the reactor system is more simpler than before and (since the cooling ability is more excellent than before) the reactor may be installed in the space much smaller than the reactor including the existing safety system, thereby much improving the operation and construction economic efficiency of the reactor.

The present invention is not limited to the above-mentioned embodiments but may be variously applied, and may be variously modified by those skilled in the art to which the present invention pertains without departing from the gist of the present invention claimed in the claims.

What is claimed is:
1. A nuclear reactor, comprising:
a reactor driving system including a reactor vessel accommodating a reactor core and a steam generator to which a steam pipe and a water supply pipe are connected; and
a reactor safety system including:
  a releasing isolation vessel accommodating gas and the reactor driving system,
  an absorbing isolation vessel formed at lower side of the releasing isolation vessel, having a passage formed as a double barrier comprised of a releasing isolation vessel barrier formed at the releasing isolation vessel and having a lower portion opened and an absorbing isolation vessel barrier formed at the absorbing isolation vessel and having an upper portion opened, communicating with the releasing isolation vessel through the passage and accommodating coolant,
  a transferring isolation vessel formed at upper side of the releasing isolation vessel and on the top of the absorbing isolation vessel and accommodating the gas and coolant, a releasing heat exchanger and an absorbing heat exchanger adjacently disposed to each other within the transferring isolation vessel to exchange heat with each other, a coolant spray pipe having one end in the absorbing isolation vessel and the other end having nozzle in the transferring isolation vessel, spraying coolant to the releasing heat exchanger and the absorbing heat exchanger adjacently disposed to each other, a condensing heat exchanger disposed outside the isolation vessels, a releasing heat exchange channel connected to the reactor vessel and the releasing heat exchanger to circularly distribute coolant, an absorbing heat exchange channel connected to the absorbing heat exchanger and the condensing heat exchanger to circularly distribute coolant, and a releasing isolation vessel communicating pipe formed to connect fluidly an upper portion of the releasing isolation vessel and an upper portion of the transferring isolation vessel, wherein coolant within the reactor safety system is selectively distributed in response to thermal-hydraulic conditions changed depending on a change in pressure within the reactor driving system and whether coolant is leaked to cool the reactor driving system.

2. The nuclear reactor of claim 1, wherein in the reactor safety system, coolant sprayed from the coolant spray pipe absorbs heat from coolant distributed within the releasing heat exchanger to be evaporated, coolant distributed within the absorbing heat exchanger absorbs heat of steam generated by the evaporation to condense the steam and is accommodated into the transferring isolation vessel, a heat transfer is made by a two-phase heat transfer mechanism for transferring heat from coolant within the releasing heat exchanger to coolant within the absorbing heat exchanger by evaporating and condensing coolant sprayed by the coolant spray pipe.

3. The nuclear reactor of claim 1, wherein the coolant spray pipe has one end communicating with the absorbing isolation vessel to be supplied with coolant and the other end provided with a nozzle to spray supplied coolant to the releasing heat exchanger and the absorbing heat exchanger and is provided with a coolant spray valve, and the reactor safety system further includes:
a coolant injection pipe having one end communicating with the transferring isolation vessel and the other end communicating with the releasing isolation vessel to inject coolant accommodated in the transferring isolation vessel into the releasing isolation vessel; and a coolant injection valve provided on the coolant injection pipe.

4. The nuclear reactor of claim 1, wherein the transferring isolation vessel has an accommodating barrier enclosing an area in which the releasing heat exchanger and the absorbing heat exchanger are disposed to accommodate the cold water within the transferring isolation vessel.

5. The nuclear reactor of claim 1, wherein the reactor safety system further includes:
a releasing isolation vessel communicating valve provided on the releasing isolation vessel communicating pipe.

6. The nuclear reactor of claim 1, wherein the reactor safety system further includes:
a releasing isolation vessel pressure reducing pipe formed to connect fluidly a lower portion of the releasing isolation vessel and a lower portion of the absorbing isolation vessel; and a releasing isolation vessel pressure reducing valve provided on the releasing isolation vessel pressure reducing pipe.

7. The nuclear reactor of claim 1, wherein the reactor safety system further includes:
a steam bypass pipe having one end communicating with the steam pipe and the other end communicating with the releasing heat exchange channel to distribute the steam generated by the evaporation of coolant within the steam generator to the releasing heat exchange channel; and a steam bypass valve provided on the steam bypass pipe.

8. The nuclear reactor of claim 1, wherein the reactor safety system further includes:
a steam release pipe having one end communicating with the steam pipe and the other end communicating with a space within the releasing isolation vessel to release steam generated by evaporation of coolant within the reactor vessel to the space within the releasing isolation vessel; and a steam release valve provided on the steam release pipe.

9. The nuclear reactor of claim 1, wherein the reactor safety system further includes:
a coolant supplement pipe having one end communicating with the releasing heat exchange channel and the other end communicating with a space under a surface of coolant within the absorbing isolation vessel or the transferring isolation vessel to supplement coolant to the releasing heat exchange channel; and a coolant supplement valve provided on the coolant supplement pipe.

* * * * *